(12) United States Patent
Murakami et al.

(10) Patent No.: US 6,935,455 B2
(45) Date of Patent: Aug. 30, 2005

(54) DRIVE SYSTEM CONTROL METHOD AND DRIVE POWER TRANSMISSION CONTROL SYSTEM FOR VEHICLE

(75) Inventors: Tsuyoshi Murakami, Handa (JP); Akihiro Ohno, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/994,244

(22) Filed: Nov. 23, 2004

(65) Prior Publication Data

US 2005/0121247 A1 Jun. 9, 2005

(30) Foreign Application Priority Data

Dec. 3, 2003 (JP) .............................. 2003-403963

(51) Int. Cl.$^7$ ............................................. F16D 43/20
(52) U.S. Cl. ....................... 180/244; 192/35; 192/84.7
(58) Field of Search ................................ 180/244, 245, 180/246, 247; 477/175, 176, 80; 192/35, 192/84.7

(56) References Cited

U.S. PATENT DOCUMENTS

| | | | | |
|---|---|---|---|---|
| 5,690,002 A | * | 11/1997 | Showalter | 74/650 |
| 6,699,151 B2 | * | 3/2004 | Grogg et al. | 475/88 |
| 6,725,989 B1 | * | 4/2004 | Krisher et al. | 192/35 |
| 6,848,550 B2 | * | 2/2005 | Puiu et al. | 192/35 |
| 6,880,688 B2 | * | 4/2005 | Matsumoto | 192/35 |

FOREIGN PATENT DOCUMENTS

JP          7-186766          7/1995

* cited by examiner

Primary Examiner—Tony Winner
(74) Attorney, Agent, or Firm—Oblon, Spivak, McClelland, Maier & Neustadt, P.C.

(57) ABSTRACT

A drive system control method and a drive power transmission control system for a four-wheel drive vehicle are provided for enabling the vehicle to operate selectively in an ordinary mode and an anti-vibration mode. In the ordinary mode, the connection force of a coupling device which is provided between front and rear wheel torque transmission axles is kept relatively high, and the front and rear wheel torque transmission axles are brought to connect prime drive wheels with secondary drive wheels, so that four-wheel drive traveling of the vehicle can be realized. The operation mode of the vehicle is switched from the ordinary mode to the anti-vibration mode where the secondary drive wheels slip when the vehicle begins to start in the ordinary mode. In the anti-vibration mode, the connection force of the coupling device is relatively weakened to substantially separate the front and rear wheel torque transmission axles from each other. Thus, the resilient force produced by the torsion of the front and rear wheel torque transmission axles which is caused by the slip of the prime drive wheels or the secondary drive wheels is released between the front and rear wheel torque transmission axles, so that the vibration which would otherwise be generated when the vehicle performs the four-wheel drive starting can be suppressed compared with that in the prior art.

13 Claims, 7 Drawing Sheets

DRIVE SYSTEM CONTROL METHOD AND DRIVE POWER TRANSMISSION CONTROL SYSTEM FOR VEHICLE

INCORPORATION BY REFERENCE

This application is based on and claims priority under 35 U.S.C. 119 with respect to Japanese Application No. 2003-403963 filed on Dec. 3, 2003, the entire content of which is incorporated herein by reference.

BACKGROUND OF THE INVENTION

1. Field of the Invention

The present invention relates to a drive system control method and a drive power transmission control system for a vehicle provided with a clutch device, variable in connection force, between a front wheel torque transmission axle and a rear wheel torque transmission axle.

2. Discussion of the Related Art

Heretofore, as described in Japanese unexamined, published patent application No. 7-186766 (186766/1995) for example, there have been known four-wheel drive vehicles of the construction that the connection force of a clutch device provided between a front wheel torque transmission axle and a rear wheel torque transmission axle is kept zero for a predetermined time period subsequence to the starting of the vehicle to make either of front wheels and rear wheels serve as driven wheels and is heightened to bring the vehicle into a four-wheel drive state after the expiration of the predetermined time period.

However, in the four-wheel drive vehicle, either the front wheels or the rear wheels may slip when the four-wheel drive vehicle begins to start, and the connection force of the clutch device between the front wheel torque transmission axle and the rear wheel torque transmission axle is controlled to be heightened for suppression of the slip. This may result in ending the slip to enable the vehicle to start or in causing the both of the front and rear wheels to slip further. In the latter case, some torsion is accumulated on the torque transmission axles while either the front wheels or the rear wheels are slipping but the other wheels are not slipping. When the other wheels slip with the torsion being accumulated on the torque transmission axles, the friction of those wheels with the road surface is changed from a static friction state to a dynamic friction state. This disadvantageously causes the resilient force produced by the torsion to be freed instantaneously, whereby the torque transmission axles are vibrated in the circumferential direction. As a consequence, the driver is given an unpleasant feeling or an anxious feeling.

SUMMARY OF THE INVENTION

Accordingly, it is a primary object of the present invention to provide an improved drive system control method and an improved drive power transmission control system which are capable of weakening the vibration which is generated by the cause of slip at the time of vehicle starting, to be less than that in the prior art.

Briefly, in a first aspect of the present invention, there is provided a drive system control method for a vehicle wherein a clutch device whose connection force is variable is provided between a front wheel torque transmission axle and a rear wheel torque transmission axle for transmitting a torque of a prime mover to the front wheel torque transmission axle and the rear wheel torque transmission axle for four-wheel traveling of the vehicle and wherein the degree of the connection between the front wheel torque transmission axle and the rear wheel torque transmission axle is variable in dependence on the connection force of the clutch device. The drive system control method comprises a step of judging whether or not one paired wheels of the front wheels and the rear wheels are slipping, in an ordinary mode wherein the vehicle is able to perform the four-wheel traveling; and a step of switching the operation mode of the vehicle from the ordinary mode to an anti-vibration mode in which the connection force of the clutch device is weakened compared to that in the ordinary mode, when the one paired wheels are judged to be slipping.

With this construction, the resilient force produced by the torsion of the torque transmission axles which is caused by the slip of the prime drive wheels or the secondary drive wheels is released by the clutch device provided between the torque transmission axles, so that the vibration which would otherwise be generated when the vehicle performs the four-wheel drive starting can be suppressed compared with that in the prior art.

In a second aspect of the present invention, there is provided a drive power transmission control system for a vehicle comprising a clutch device variable in connection force thereof and provided between a front wheel torque transmission axle and a rear wheel torque transmission axle for transmitting a torque of a prime mover to the front wheel torque transmission axle and the rear wheel torque transmission axle for four-wheel traveling of the vehicle, and a control section for controlling the connection force of the clutch device. The control system further comprises slip state judging means for judging the slip state of either one paired wheels of front wheels and rear wheels when the vehicle is beginning to travel in an ordinary mode for four-wheel drive traveling; slip occurrence judging means responsive to the judgment result of the slip state judging means for judging that the slip has occurred where the slip state continues longer than a predetermined time period or where a slip amount in the slip state exceeds a predetermined amount; and mode switching means responsive to the judgment result of the slip occurrence judging means for switching the operation mode of the vehicle from the ordinary mode to an anti-vibration mode in which the connection force of the clutch device is weakened compared to that in the ordinary mode.

With this construction, where the slip state of the one paired wheels of the front wheels and the rear wheels continues longer than the predetermined time period or where the slip amount in the slip state exceeds the predetermined amount when the vehicle is beginning to travel in the ordinary mode for four-wheel drive traveling, the resilient force produced by the torsion which has been given by the slip on the front and rear wheel torque transmission axles is released by the clutch device provided between the front and rear wheel torque transmission axles, so that the vibration which would otherwise be generated when the vehicle performs the four-wheel drive starting can be suppressed compared with that in the prior art.

BRIEF DESCRIPTION OF THE ACCOMPANYING DRAWINGS

The forgoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
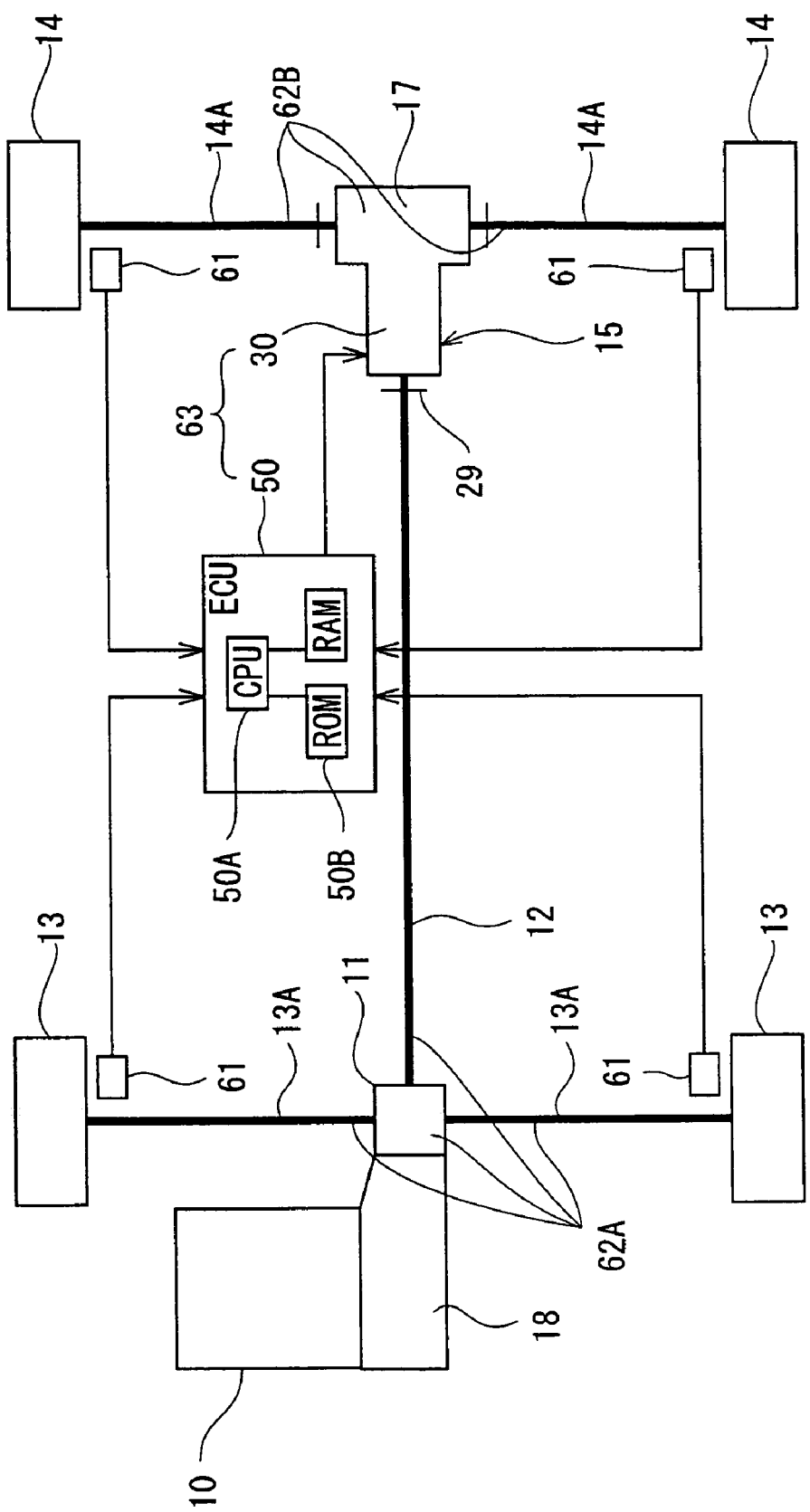
FIG. 1 is a schematic view of a vehicle in one embodiment according to the present invention.

Hereinafter, a first embodiment of the present invention will be described with reference to FIGS. 1 to 5. FIG. 1 shows primary components of a vehicle drive system. In the present embodiment, an engine 10 as a prime mover is arranged on the front side of a vehicle. Left and right front wheels 13, 13 as prime drive wheels are connected to each other by a front differential 11, while left and right rear wheels 14, 14 are connected to each other by a rear differential 17.

The front differential 11 is connected to an output shaft of the engine 10 through a transmission 18. Thus, the output power of the engine 10 is gear-changed to be transmitted to the front differential 11, and the front wheels 13, 13 are driven.

A front end portion of a propeller shaft 12 is connected to the front differential 11 through a transfer mechanism (not shown). Further, the propeller shaft 12 has connected at its rear end portion to one end portion of a coupling device 30, which is connected at the other end portion thereof to the rear differential 17 through another transfer mechanism referred to later.

That is, in the present embodiment, a front wheel torque transmission axle 62A is composed of the propeller shaft 12, the front differential 11 and constant velocity joints 13A, 13A provided between the front differential 11 and the front wheels 13, 13, while a rear wheel torque transmission axle 62B is composed of the rear differential 17 and constant velocity joints 14A, 14A provided between the rear differential 17 and the rear wheels 14, 14. A main clutch section 39 referred to later which is provided in the coupling device 30 constitutes a clutch device, and the connection force between the front and rear wheel torque transmission axles 62A, 62B is variable by the main clutch section 39.

Figure 2:
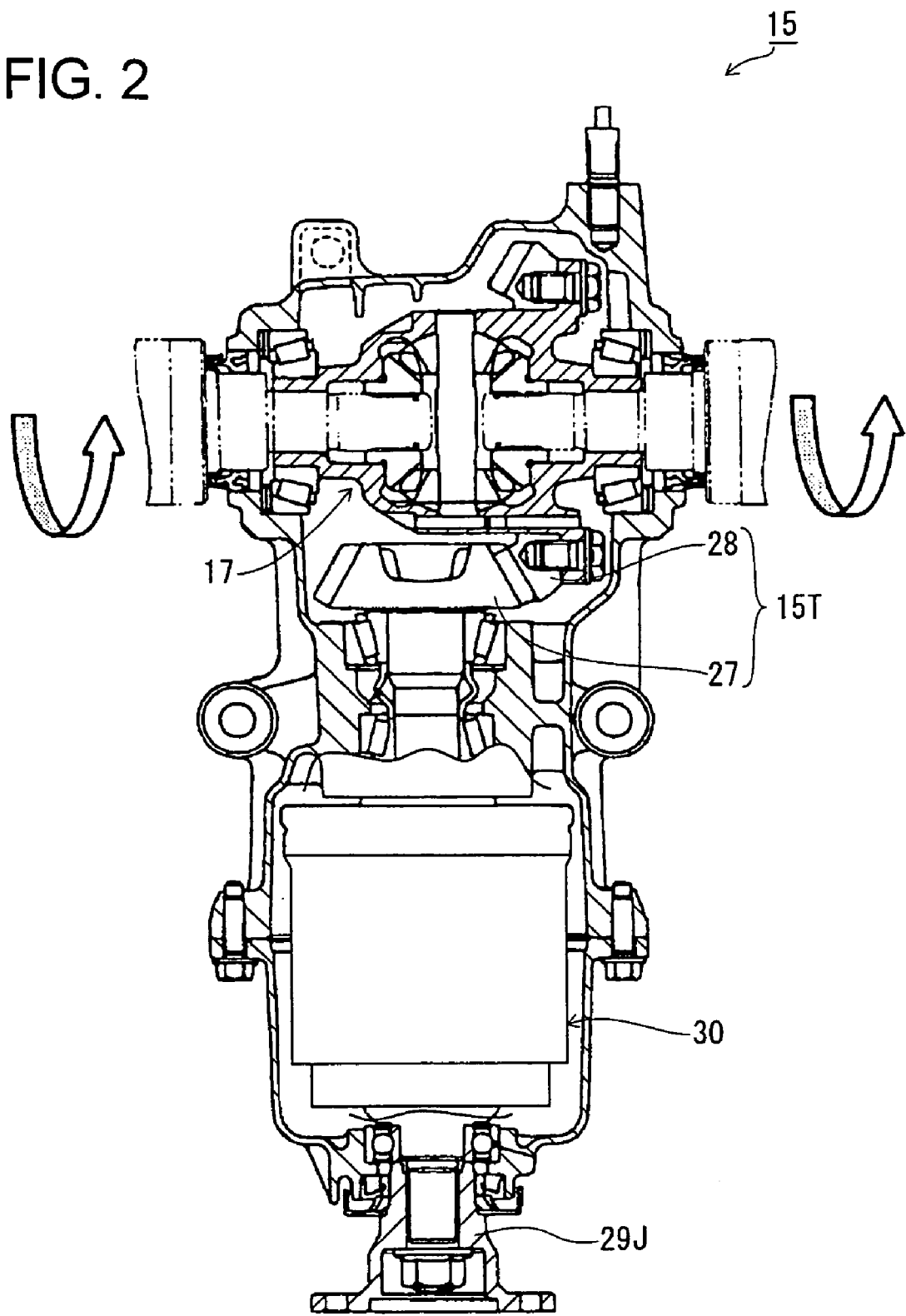
FIG. 2 is a sectional view of a rear differential assembly incorporating a coupling device therein.

As shown in FIG. 2, the coupling device 30, the rear differential 17 and the aforementioned transfer mechanism 15T are integrated as one unit to constitute a rear differential assembly 15 for the rear wheels 14, 14. The transfer mechanism 15T is composed of a ring-like transfer bevel gear 28 which is fixedly fit on the external surface of the rear differential 17, and a transfer bevel pinion 27 which is secured to the rear end portion of the coupling device 30 in meshing engagement with the ring-like transfer bevel gear 28.

Figure 3:
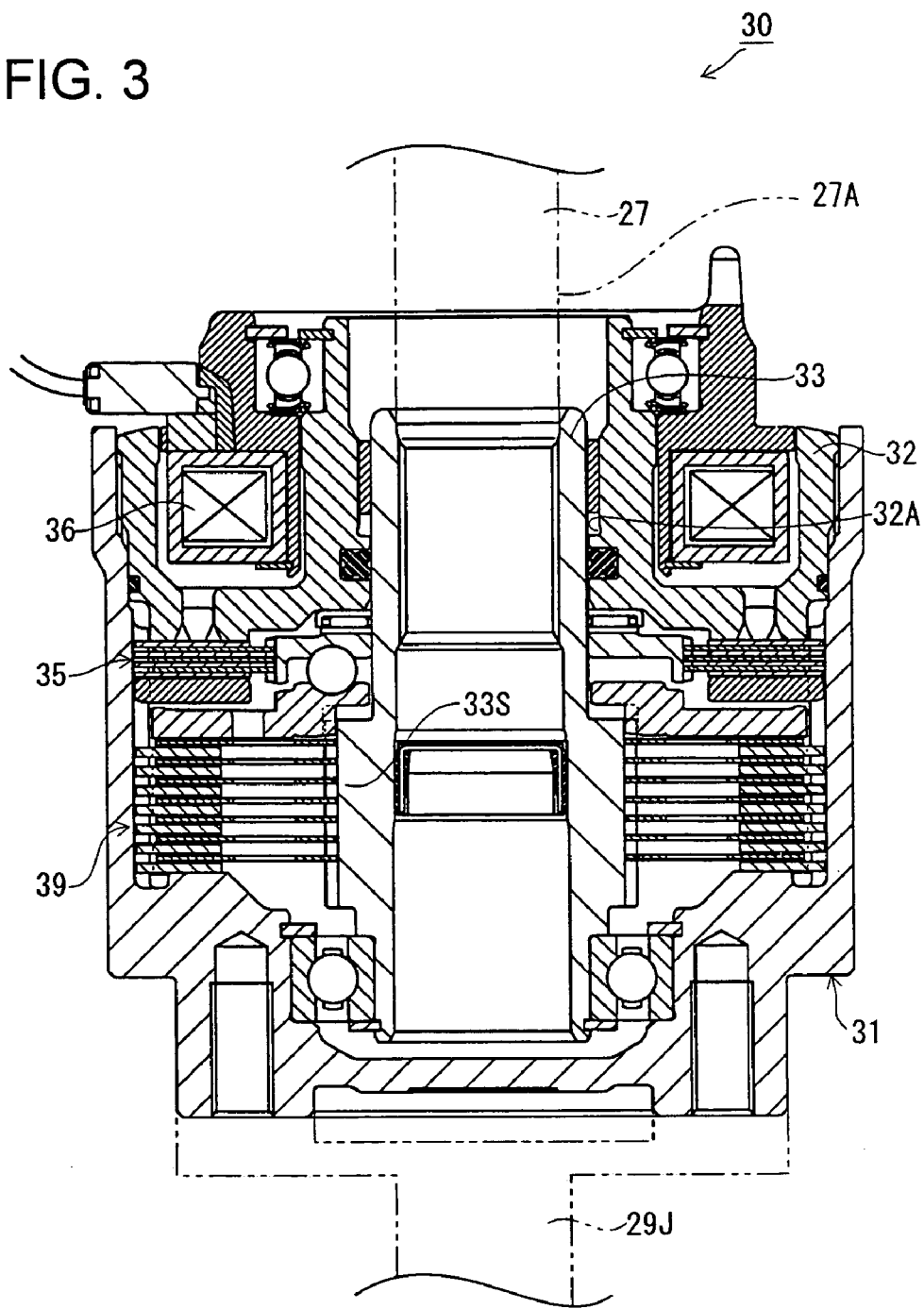
FIG. 3 is a sectional view of the coupling device.

As shown in FIG. 3, the coupling device 30 is provided with a cup-shape outer cylinder case 31, and a joint shaft 29J extending from a bottom wall of the outer cylinder case 31 is connected to the propeller shaft 12, as schematically shown in FIG. 1. Further, a cap member 32 is screw-fixed to an opening end of the outer cylinder case 31, and a through hole 32A formed at the center of the cap member 32 has an inner shaft 33 passing therethrough. The inner shaft 33 is in spline engagement with a transfer bevel pinion shaft 27A which is provided with the transfer bevel pinion 27 at one end thereof, for bodily rotation with the transfer bevel pinion shaft 27A.

An axial mid portion of the inner shaft 33 is formed with a spline shaft portion 33S, and plural main inner clutch plates are spline-engaged with the external surface of the spline shaft portion 33S. Plural main outer clutch plates are spline-engaged with the internal surface of the other cylinder case 31. The main inner clutch plates and the main outer clutch plates are arranged in an alternate fashion to constitute the main clutch section 39.

Further, a pilot clutch section 35 for varying the connection state of the main clutch section 39 is provided at a position close to the cap member 32. The pilot clutch section 35 serves to axially pressure the main clutch section 39 in dependence on a magnetic force generated by an electromagnetic coil 36 which is arranged axially outside of the cap member 32. Thus, the connection state of the main clutch section 39 is changeable to a direct connection state in which the main inner and outer clutch plates of the main clutch section 39 are engaged to be bodily, a separation state in which the main inner and outer clutch plates of the main clutch section 39 are separated from one another, and a half clutch state which is between the direct connection state and the separation state.

The electromagnetic coil 36 of the coupling device 30 is connected to an ECU (Electronic Control Unit) 50 (shown in FIG. 1) mounted on the vehicle. The main clutch section 39 of the coupling device 30 and the ECU 50 as a control section constitute a drive power transmission control system 63 in the present invention. The ECU 50 has connected thereto four speed sensors 61 arranged in correspondence respectively to the respective wheels 13, 13, 14, 14, and these speed sensors 61 are provided for respectively detecting rotational speeds of the front wheels 13, 13 and the rear wheels 14, 14. The ECU 50 is provided therein with a CPU 50A, which takes thereinto signals and information from various parts of the vehicle to automatically switch the operation mode of the vehicle into an ordinary mode or an anti-vibration mode. When the front wheels 13 or the rear wheels 14 slip at the time of starting in the ordinary mode, the coupling device 30 is brought into, e.g., the direct connection state, whereby the front wheels 13 and the rear wheels 14 are connected to each other by the front and rear wheel torque transmission axles 62A and 62B. When the operation mode of the vehicle is switched into the anti-vibration mode, on the other hand, the connection force at the main clutch section 39 of the coupling device 30 is weakened compared with that in the ordinary mode, that is, is confined to be equal to or less than, e.g., 50 percents of that in the direct connection state.

Figure 4:
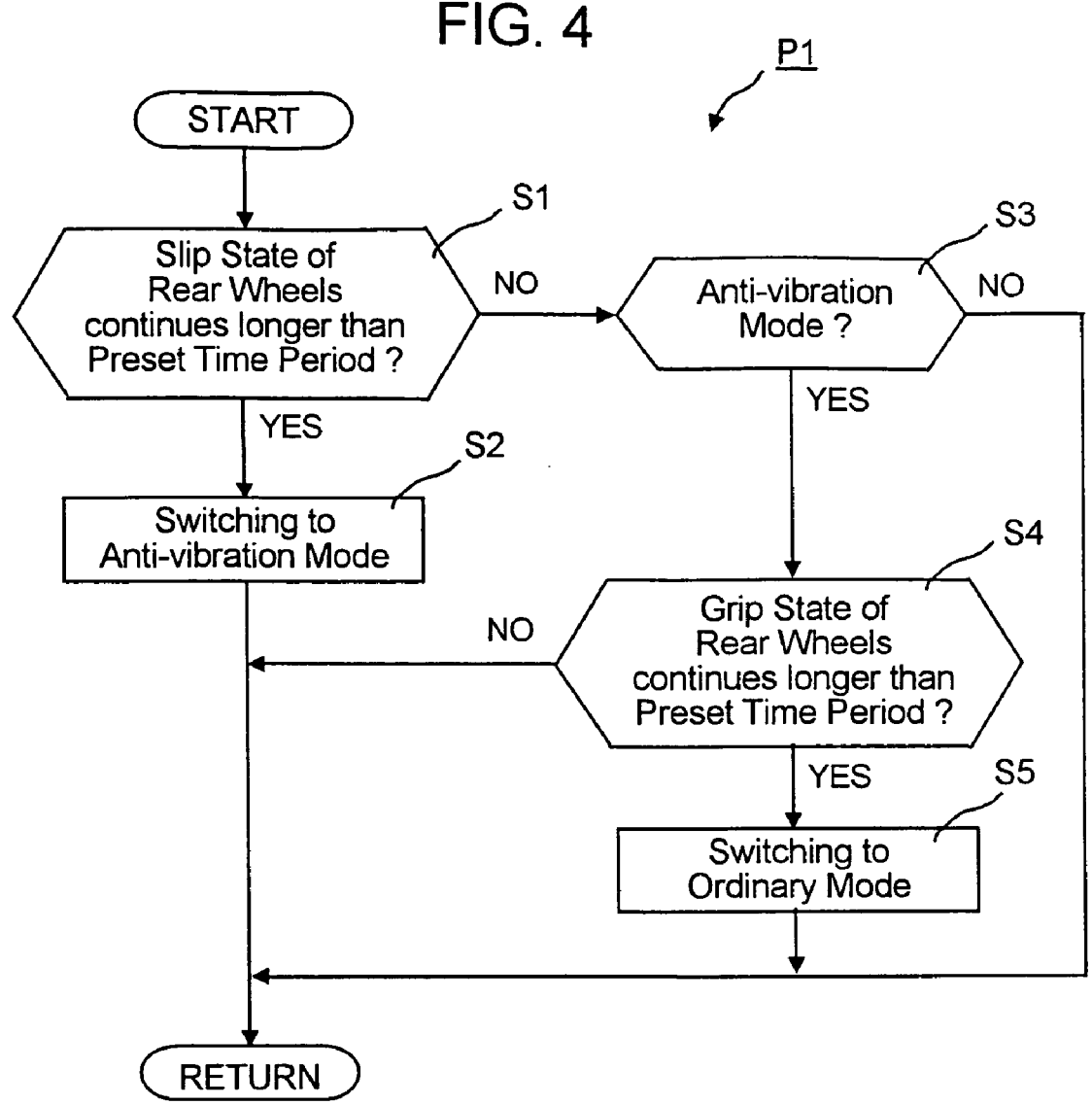
FIG. 4 is a flowchart showing an anti-vibration processing program.
Figure 5:
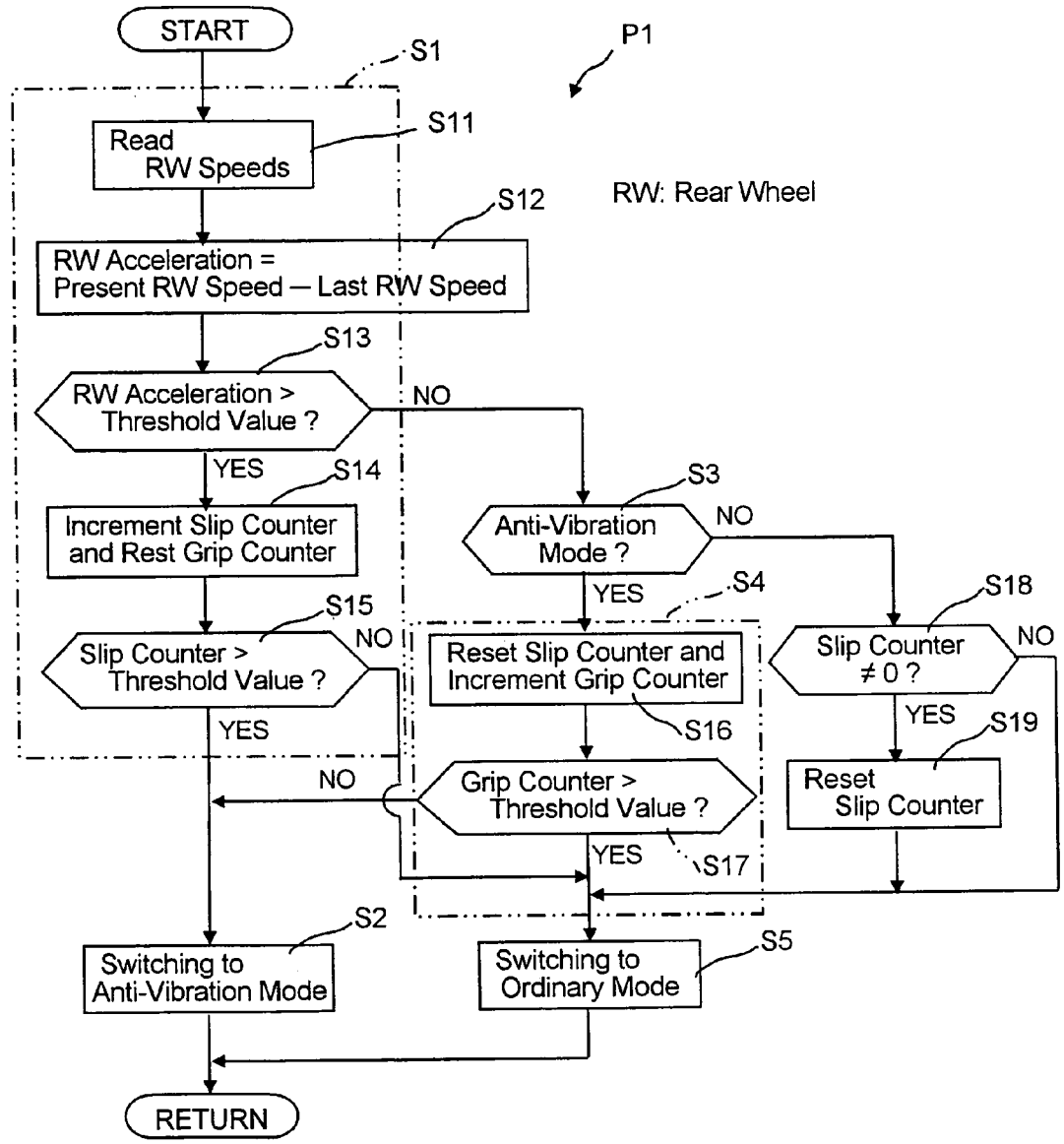
FIG. 5 is a flowchart showing the details of the anti-vibration processing program.

A ROM 50B connected to the CPU 50A has stored therein an anti-vibration processing program P1 shown in FIGS. 4 and 5. The CPU 50A repetitively executes the anti-vibration processing program P1 at a regular time interval and is automatically switched based on the processing result of the anti-vibration processing program P1 to operate in the ordinary mode or the anti-vibration mode.

More specifically, as shown in FIG. 4, upon execution of the anti-vibration processing program P1, it is judged at step S1 whether or not the slip of the rear wheels 14 continues longer than a predetermined reference time period (e.g., 120 milliseconds). Where the slip of the rear wheels 14 continues longer than the predetermined reference time period (YES at step S1), switching is made at step S2 to the anti-vibration mode, and the CPU 50A leaves this anti-vibration processing program P1.

When the rear wheels 14 are not in the slip state or when the slip state does not continue longer than the predetermined reference time period (NO at step S1), it is judged at step S3 whether or not the present mode is the anti-vibration mode. When it is the anti-vibration mode at this time (YES at step S3), judgment is further made at step S4 whether or not a grip state of the rear wheels 14 (i.e., the state of the rear wheels 14 gripping the road surface) continues longer than the predetermined reference time period. Where the grip state of the rear wheels 14 continues longer than the predetermined reference time period (YES at step S4), switching is made at step S5 to the ordinary mode to leave the anti-vibration processing program P1. Further, when the rear wheels 14 is not in the grip state or when the grip state does not continue longer than the predetermined reference time period (NO at step S4), the present mode is kept to be the anti-vibration mode before leaving the anti-vibration processing program P1.

Further, when the rear wheels 14 are not in the slip state or the slip state does not continue longer than the predetermined reference time period (NO at step S1) and when the present mode is not the anti-vibration mode (NO at step S3), the CPU 50A leaves this anti-vibration processing program P1 with the present mode being kept to be the ordinary mode. That is, the anti-vibration processing program P1 in the present embodiment is constructed to execute the mode switching on the condition that either of the slip state and grip state of the rear wheels 14 continues longer than the predetermined reference time period. Thus, control is performed not to execute the mode switching in a slip state of such a level that does not cause the generation of vibration.

In the foregoing anti-vibration processing program P1, whether the rear wheels 14 are in the slip state or the grip state is judged in dependence on whether or not the acceleration of the rear wheels 14 has exceeded a predetermined threshold value. Further, the time period for which each of the slip state and the grip state continues is timed by a counter function incorporated in the anti-vibration processing program P1.

Specifically, as the detailed construction of the anti-vibration processing program P1 is shown in FIG. 5, the CPU 50A takes thereinto at step S11 the rotational speeds of the rear wheels 14 detected by the speed sensors 61 upon execution of the anti-vibration processing program P1. Then, at step S12, the CPU 50A calculates as the acceleration of the rear wheels 14 the difference between the rotational speed of the rear wheels 14 which was taken when the anti-vibration processing program P1 was executed at the last time and the rotational speed of the rear wheels 14 which was taken this time. In this particular embodiment, in calculating the acceleration of the rear wheels 14, the difference between the last rotational speed and the present rotational speed is calculated for each of the left and right rear wheels 14, 14, and a greater one of the two differences so calculated is taken as the acceleration of the rear wheels 14. Instead, in calculating the acceleration of the rear wheels 14, the rotational speed of the rear wheels 14 at each of the last time and the present time may be obtained as the average rotational speed of the left and right rear wheels 14, 14. Then, at step S13, the CPU 50A judges whether or not the calculated acceleration is greater than a predetermined threshold value for acceleration judgment. For example, this predetermined threshold value for acceleration judgment is an acceleration which corresponds to 0.7 G (approximately 6.86 m/s$^2$) where converted into the acceleration of the vehicle on the assumption that all of the respective wheels are completely in the grip state.

When the acceleration of the rear wheels 14 is greater than the predetermined threshold value for acceleration judgment (YES at step S13), a slip counter for timing a slip time period is incremented by "1", and at the same time, a grip counter for timing a grip time period is reset at step S14. Then, switching to the anti-vibration mode is made at step S2 if the value of the slip counter has become greater than a predetermined threshold value for the slip counter (YES at step S15), that is, where the slip time period continues longer than the predetermined time period. However, switching to the ordinary mode is made at step S5 if the value of the slip counter is not greater than the predetermined threshold value for the slip counter (NO at step S15), that is, where the slip time period does not continue longer than the predetermined time period.

On the contrary, where the acceleration of the rear wheels 14 is not greater than the predetermined threshold value for acceleration judgment (NO at step S13), it is judged at step S3 whether or not the present mode is the anti-vibration mode. If it is the anti-vibration mode (YES at step S3), the slip counter is reset, and the grip counter is incremented by "1" at step S16. Then, switching to the ordinary mode is made at step S5 if the value of the grip counter has become greater than a predetermined threshold value for the grip counter (YES at step S17), that is, where the grip time period continues longer than the predetermined time period. However, switching to the anti-vibration mode is made at step S2 if the value of the grip counter is not greater than the predetermined threshold value for the grip counter (NO at step S17), that is, where the grip time period does not continue longer than the predetermined time period.

Further, where the acceleration of the rear wheels 14 is not greater than the acceleration threshold value (NO at step S13), where the present mode is not the anti-vibration mode (NO at step S3) and where the value of the slip counter is not zero (YES at step S18), the slip counter is reset at step S19 before the operation mode is then set to the ordinary mode at step S5. Where the step counter is zero at step S18 (NO at step S18), on the contrary, the ordinary mode is kept as it is at step S5 without resetting the slip counter at step S19.

Next, the function and advantages of the anti-vibration processing program P1 will be described along with the operation of the vehicle.

When an ignition switch (not shown) provided on the vehicle is turn to "ON", the engine 10 is started. When the driver shifts a shift lever by the driver's seat to a traveling range like a drive range, a torque is transmitted from the transmission 18 to the propeller shaft 12. In this state, no drive electric current is flown through the electromagnetic coil 36 of the coupling device 30, so that the main inner and outer clutch plates of the main clutch section 39 remain separated from each other, that is, remain in a two-wheel drive state.

By the way, the front wheels 13 and the rear wheels 14 are not necessarily the same in their states of gripping the road surface. That is, since in this particular embodiment, the engine 10 which is a heavy component is arranged at the front side of the vehicle, the front wheels 13 with a relatively heavy load applied thereon is less liable to slip than the rear wheels 14. For this reason, in this particular embodiment, the front wheels 13 serve as prime drive wheels. However, it may be the case that either or both of the left and right front wheels 13, 13 slip when the vehicle travels on a low friction road such as a snowy road or the like or when an extraordinarily large torque is applied to the front wheels 13, 13. If one of the front wheels 13 slipped, the differential function of the front differential 11 would cause the torque not to be transmitted to the other front wheel 13, whereby the vehicle would be unable to start. In this event, an attempt may be made to heighten the rate of torque distribution to the rear wheels 14, 14 and to end the slip of the one front wheel 13 by strengthening the connection force of the main clutch section 39 so that the vehicle can start steadily with the traction being distributed to the four wheels. This attempt would result in ending the slip to make the vehicle start or would result in causing the rear wheels 14 to slip as well. If the rear wheels 14 also slipped, vibration would be generated on the torque transmission axles 62A, 62B on the front and rear wheel sides. That is, with the front wheels 13 slipping and the rear wheels 14 not slipping, almost all of the torque from the engine 10 is transmitted to the rear wheels 14 side, during which torsion is generated and accumulated on the propeller shaft 12. At the moment when the rear wheels 14 begin to slip in this state, the torsion which has been generated and accumulated on the propeller shaft 12 is released instantaneously. For this reason and because the rear wheels 14, 14 and the components rotatable bodily therewith are also large in inertia, it is liable that the front and rear wheel torque transmission axles 62A, 62B are caused to vibrate.

With the construction in the present embodiment, however, where the slip state of the front wheels 13 continues longer than the predetermined reference time period, the operation mode is automatically switched to the anti-vibration mode. As a consequence, the connection force of the main clutch section 39 of the coupling device 30 is weakened compared with that in the direct connection state, and an intermediate portion between the front and rear wheel torque transmission axles 62A, 62B is substantially divided, so that the resilient force caused by the torsion of the torque transmission axles 62A, 62B can be released at the intermediate portion. Although some vibration is produced on the torque transmission axles 62A, 62B even at this moment, the vibration is quite small and is damped quickly because the front wheel torque transmission axle 62A is separated from the torque transmission axle 62B connected to the rear wheels 14 and the like which have a large inertia during the slip. Accordingly, it does not occur that the driver is given an unpleasant feeling or an anxious feeling.

Thereafter, where the grip state continues longer than the predetermined reference time period after the rear wheels 14 are brought into the grip state, the operation mode is restored from the anti-vibration mode to the ordinary mode.

As described above, in the drive system control method and the drive power transmission control system 63 for the vehicle, the intermediate portion between the front and rear wheel torque transmission axles 62A, 62B is substantially divided when the rear wheels 14 slip at the time of the vehicle starting. Thus, though the resilient force is produced by the torsion of the torque transmission axles 62A, 62B which results from the slip of either of the front wheels 13 and the rear wheels 14, such resilient force is released at the intermediate portion between the torque transmission axles 62A, 62B, so that the vibration the vehicle suffers at the starting can be suppressed to be smaller than that in the prior art.

Second Embodiment

A second embodiment is different from the foregoing first embodiment in the construction for an anti-vibration processing executed by the drive power transmission control system 63. Hereinafter, description will be made regarding the constructions which are different from those in the first embodiment, and repetitive description on the same components as those in the first embodiment will be omitted by putting the same reference numerals on the same components.

Figure 6:
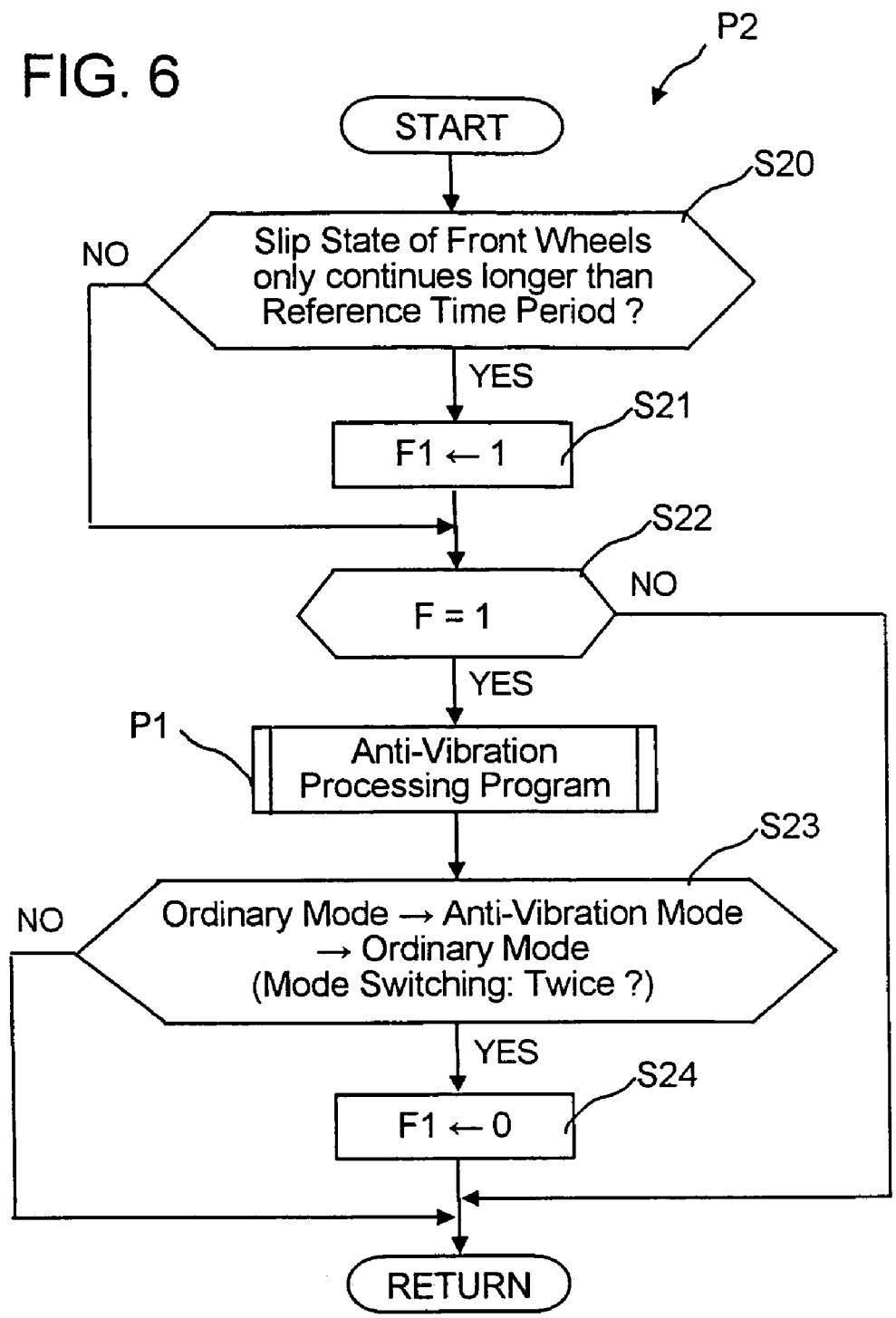
FIG. 6 is a flowchart showing a phenomenon-dependent anti-vibration processing program.

The CPU 50A of the ECU 50 provided in the drive power transmission control system 63 in this second embodiment executes a phenomenon-dependent anti-vibration processing program P2 including the anti-vibration processing program P1 described in the first embodiment, at a regular time interval. As shown in FIG. 6, when the phenomenon-dependent anti-vibration processing program P2 is executed, judgment is made at step S20 as to whether or not the state that the front wheels 13 only are slipping continues longer than a predetermined reference time period.

In this second embodiment, whether the front wheels 13 are in the slip state or the grip state is judged in dependence on whether or not the acceleration of the front wheels 13 has exceeded a predetermined threshold value. Further, the time period for which each of the slip state and the grip state continues is timed by a counter function incorporated for this step S20 though the details thereof are substantially the same as those shown at step S1 in FIG. 5 and therefore are not shown in FIG. 6 for the sake of brevity. Further, in calculating the acceleration of the front wheels 13, the difference between the last rotational speed and the present rotational speed may be calculated for each of the left and right front wheels 13, and a greater one of the two differences so calculated is taken as the acceleration of the front wheels 13. Instead, in calculating the acceleration of the front wheels 13, the rotational speed of the front wheels 13 at each of the last time and the present time may be obtained as the average rotational speed of the left and right front wheels 13.

Where the state that the front wheels 13 only are slipping continues longer than the predetermined reference time period (YES at step S20), the routine proceeds to another subsequent step S22 following the next step S21 after storing "1" in a flag F1 at the next step S21, and where it is not the case (NO at step S20), the routine proceeds to the another subsequent step S22 without altering the content of the flag F1. At the another subsequent step S22, judgment is made of whether or not the flag F1 indicates "1", and if it indicates "1" (YES at step S22), the anti-vibration processing program P1 described in the foregoing first embodiment is executed.

Subsequently, following the leaving of the anti-vibration processing program P1, judgment is made at step S23 of whether or not the switching of the operation mode has been executed twice after the flag F1 is set to "1". That is, it is judged whether or not the operation mode is returned back to the ordinary mode after once switched from the ordinary mode to the anti-vibration mode. Where the operation mode is returned to the ordinary mode after once switched to the anti-vibration mode (YES at step S23), the CPU 50A resets the flag F1 to "0" at step S24 and leaves the phenomenon-dependent anti-vibration processing program P2. Where the judgment at step S23 is not affirmative (NO at step S23), the CPU 50A leaves the phenomenon-dependent anti-vibration processing program P2 without resetting the flag F1 to "0".

With the construction in the aforementioned second embodiment, where the front wheels 13 and the rear wheels 14 slip simultaneously at the time of vehicle starting, the anti-vibration processing program P1 is not executed because such state is different from the state in which the front wheels 13 only slip (NO at step S20). Similarly, where the rear wheels 14 only slip at the time of vehicle starting, the anti-vibration processing program P1 is not executed because such state is also different from the state in which the front wheels 13 only slip (NO at step S20). On the contrary, where the front wheels 13 only continue to slip longer than the predetermined reference time period (YES at step S20), the anti-vibration processing program P1 is executed. That is, only in the case that the rear wheels 14 slip following the slip of the front wheels 13, the operation mode is switched from the ordinary mode to the anti-vibration mode. As a consequence, even when the four wheels slip simultaneously in the ordinary mode (i.e., four-wheel drive mode), it does not occur that the operation mode is switched to the anti-vibration mode, so that the vehicle can start steadily on a slippery road surface.

Third Embodiment

Figure 7:
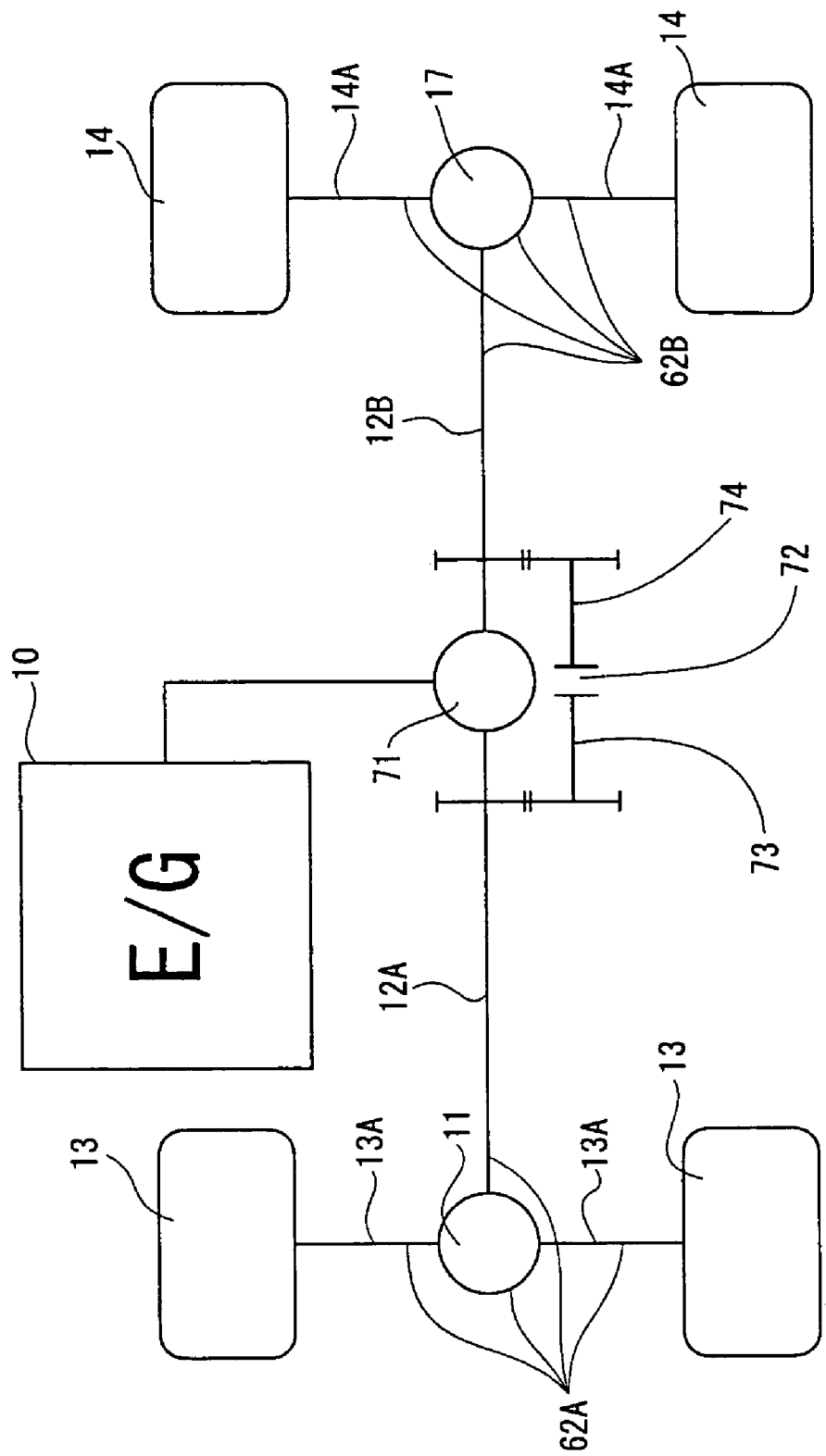
FIG. 7 is a schematic view showing a vehicle of a so-called "center differential type".

In this third embodiment, the present invention is applied to a vehicle of the center differential type shown in FIG. 7. The vehicle is provided with a center differential 71 at the mid position in the front-rear direction. An input portion of the center differential 71 is connected to the engine 10. The center differential 71 is provided with a pair of output portions, one of which is connected to front side propeller shaft 12A extending from the front differential 11 and the other of which is connected to a rear side propeller shaft 12B extending from the rear differential 17. Thus, the front wheels 13 and the rear wheels 14 can be driven by the engine 10 with the relative rotation being permitted therebetween.

In the present embodiment, the front wheel torque transmission axle 62A is composed of the front side propeller shaft 12A, the front differential 11 and the constant velocity joints 13A provided between the front differential 11 and the front wheels 13, whereas the rear wheel torque transmission axle 62B is composed of the rear side propeller shaft 12B, the rear differential 17 and the constant velocity joints 14A provided between the rear differential 17 and the rear wheels 14.

Between the front and rear side propeller shafts 12A, 12B, a clutch device 72 featuring the present invention is provided in parallel relation with the center differential 71. More specifically, a front side shaft 73 connected to a rear end of the front side propeller shaft 12A through gears (not numbered) is arranged in axial alignment with a rear side shaft 74 connected to a front end of the rear side propeller shaft 12B through gears (not numbered), and plural clutch plates (e.g., inner or outer clutch plates) provided on the front side shaft 73 are frictionally engageable with plural clutch plates (e.g., outer or inner clutch plates) provided on the rear side shaft 74. Thus, the connection force between the front wheel torque transmission shaft 62A and the rear wheel torque transmission shaft 62B is made to be variable by the clutch device 72 in dependence on the driving or traveling state of the vehicle. Other constructions not described above are the same as those corresponding thereto in the foregoing first embodiment, and therefore, description on such other constructions are omitted for the sake of brevity.

The same functions and advantages as those in the foregoing first embodiment can be accomplished even in the aforementioned vehicle of the center differential type to which the present invention is applied.

Further Embodiments or Modifications

The present invention is not limited to the foregoing embodiments. For example, further embodiments or modifications which will be described hereafter are also encompassed in the scope of the present invention. Moreover, the present invention can be practiced in various forms which are modified or altered not to depart from the gist of the present invention, in addition to the further embodiments or modifications described hereafter.

(1) The foregoing first embodiment takes the construction that the intermediate portion between the torque transmission axles 62A, 62B is substantially divided when the operation mode is switched to the anti-vibration mode. Instead, in the anti-vibration mode, the coupling device 30 may be kept in the state of a so-called "half clutch connection" so that the resilient force produced by the torsion which is accumulated on the torque transmission axles 62A, 62B may be gradually released to suppress the vibration.

(2) Although the vehicle in the foregoing first embodiment is of the type that the front wheels 13 act as prime drive wheels and that the rear wheels 14 act as secondary or sub-drive wheels, a modification may be made so that the rear wheels 14 act as prime drive wheels and that the front wheels 13 act as secondary or sub-drive wheels. In this modification, the anti-vibration processing program P1 shown in FIG. 5 is modified or altered to calculate the acceleration of the front wheels 13 in place of the acceleration of the rear wheels 14 and to judge whether or not the acceleration of the front wheels 13 continues to exceed a predetermined threshold value for a longer time period than a predetermined reference time period in the same manner as described with respect to the rear wheels 14 with reference to FIG. 5.

(3) The foregoing first embodiment takes the construction that the operation mode is switched from the ordinary mode to the anti-vibration mode where the rear wheels 14 continue to slip longer than the predetermined reference time period. Instead, there may be taken another construction wherein the rotational amount of the prime drive wheels in the slip state is detected so that the operation mode can be switched from the ordinary mode to the anti-vibration mode when the detected rotational amount exceeds a predetermined reference value.

(4) It is not judged in any of the foregoing first and second embodiments whether or not the vehicle is beginning to start. Another modified embodiment may take another construction wherein the vehicle is assumed to be at the time of starting while it travels at a lower speed than a predetermined speed (e.g., 15 km/h) and wherein the operation mode is automatically switched from the ordinary mode to the anti-vibration mode only at the time of such starting, but is not automatically switched from the ordinary mode to the anti-vibration mode even at the occurrence of the slip while the vehicle travels at a higher speed than the predetermined speed. With this construction taken, the operation mode is prevented from being automatically switched to the anti-vibration mode during the traveling at any of medium and high speeds, so that the stable traveling of the vehicle can be realized.

(5) The foregoing second embodiment takes the construction that the switching of the operation mode is effected on the condition that the rear wheels 14 slip following the slip of the front wheels 13. However, still another modification may take the construction that the switching of the operation mode is executed only where the rear wheels 14 begin to slip within a predetermined time period subsequent to the slip of the front wheels 13, but is not executed where the rear wheels 14 begin to slip after the expiration of the predetermined time period.

Various features and many of the attendant advantages in the foregoing embodiments will be summarized as follows:

In the drive system control method and the drive power transmission control system 63 in one of the foregoing embodiments, the resilient force produced by torsion of the torque transmission axles 62A, 62B which is caused by the slip of the prime drive wheels 13 or the secondary drive wheels 14 is released between the torque transmission axles 62A, 62B, so that the vibration which would otherwise be generated when the vehicle performs the four-wheel drive starting can be suppressed compared with that in the prior art.

In the drive system control method and the drive power transmission control system 63 in one of the foregoing embodiments, on the condition that the vehicle is beginning to travel and that the slip of one paired wheels of the front wheels 13 and the rear wheels 14 occurs following the occurrence of the slip of the other paired wheels, the operation mode is switched from the ordinary mode to the anti-vibration mode to confine the connection force of the clutch device 30 to be equal to or less than a predetermined connection force which is able to suppress the vibration of the torque transmission axles 62A, 62B. Thus, since the switching from the ordinary mode to the anti-vibration mode is restricted to be done at the time of the vehicle starting, the operation mode is prevented from being automatically switched to the anti-vibration mode during the traveling at any of medium and high speeds, so that the stable traveling of the vehicle can be realized. Further, since the switching of the operation mode is restricted to be effected where the slip of one paired wheels of the front wheels 13 and the rear wheels 14 occurs following the occurrence of the slip of the other paired wheels, the operation mode is prevented from being switched to the anti-vibration mode where the both paired wheels of the front wheels 13 and the rear wheels 14 slip simultaneously, so that it can be realized to make the vehicle start steadily even on a slippery road.

In the drive system control method and the drive power transmission control system 63 in one of the foregoing embodiments, the operation mode is returned from the anti-vibration mode to the ordinary mode when all of the front and rear wheels 13, 14 come out of the slip state. Thus, it can be realized to effect the switching from the anti-vibration mode to the ordinary mode at such an appropriate time that an increase in the connection force of the clutch device 30 hardly causes the front and rear wheel torque transmission axles 62A, 62B to vibrate.

In the drive system control method and the drive power transmission control system 63 in one of the foregoing embodiments, either one paired wheels of the front wheels 13 and the rear wheels 14 are judged to be slipping if the rotational acceleration of either one of the front wheels 13 or the rear wheels 14 exceeds a predetermined threshold value. Thus, the occurrence of the slip state can be judged accurately.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive system control method for a vehicle wherein a clutch device whose connection force is variable is provided between a front wheel torque transmission axle and a rear wheel torque transmission axle for transmitting a torque of a prime mover to the front wheel torque transmission axle and the rear wheel torque transmission axle for four-wheel traveling of the vehicle and wherein the degree of the connection between the front wheel torque transmission axle and the rear wheel torque transmission axle is variable in dependence on the connection force of the clutch device, the drive system control method comprising the steps of:

judging whether or not one paired wheels of the front wheels and the rear wheels are slipping, in an ordinary mode wherein the vehicle is able to perform the four-wheel traveling; and when the one paired wheels are judged to be slipping, switching the operating mode of the vehicle from the ordinary mode to an anti-vibration mode in which the connection force of the clutch device is weakened compared to that in the ordinary mode.

2. The drive system control method as set forth in claim 1, further comprising the steps of:

judging whether or not the other paired wheels of the front wheels and the rear wheels are slipping together with the one paired wheels; and on the condition that the slip of the one paired wheel occurs following the occurrence of the slip of the other paired wheels when the vehicle is beginning to travel, switching the operation mode from the ordinary mode to the anti-vibration mode for confining the connection force of the clutch device to be equal to or less than a predetermined connection force which is able to suppress the vibration of the torque transmission axles.

3. The drive system control method as set forth in claim 2, further comprising the step of:

returning the operation mode from the anti-vibration mode to the ordinary mode when all of the front and rear wheels come out of the slip state.

4. The drive system control method as set forth in claim 2, wherein the front wheels are judged to be slipping if the rotational acceleration of either one of the front wheels exceeds a predetermined threshold value, and wherein the rear wheels are judged to be slipping if the rotational acceleration of either one of the rear wheels exceeds a predetermined threshold value.

5. The drive system control method as set forth in claim 3, wherein the front wheels are judged to be slipping if the rotational acceleration of either one of the front wheels exceeds a predetermined threshold value, and wherein the rear wheels are judged to be slipping if the rotational acceleration of either one of the rear wheels exceeds a predetermined threshold value.

6. In a drive power transmission control system for a vehicle comprising a clutch device variable in connection force thereof and provided between a front wheel torque transmission axle and a rear wheel torque transmission axle for transmitting a torque of a prime mover to the front wheel torque transmission axle and the rear wheel torque transmission axle for four-wheel traveling of the vehicle, and a control section for controlling the connection force of the clutch device, the improvement comprising:

slip state judging means for judging the slip state of either one paired wheels of front wheels and rear wheels when the vehicle is beginning to travel in an ordinary mode for four-wheel drive traveling;

slip occurrence judging means responsive to the judgment result of the slip state judging means for judging that the slip has occurred where the slip state continues longer than a predetermined time period or where a slip amount in the slip state exceeds a predetermined amount; and mode switching means responsive to the judgment result of the slip occurrence judging means for switching the operation mode of the vehicle from the ordinary mode to an anti-vibration mode in which the connection force of the clutch device is weakened compared to that in the ordinary mode.

7. The drive power transmission control system as set forth in claim 6, wherein the mode switching means switches the operation mode of the vehicle from the ordinary mode to the anti-vibration mode when the either one paired wheels of the front wheels and the rear wheels begin to slip within a predetermined time period subsequent to the occurrence of the slip on the other paired wheels of the front wheels and the rear wheels.

8. The drive power transmission control system as set forth in claim 6, wherein the mode switching means returns the operation mode from the anti-vibration mode to the ordinary mode where a grip state in which the occurrence of the slip state is not judged by the slip state judging means continues longer than a predetermined time period in the anti-vibration mode or where the traveling distance of the vehicle in the grip state continues longer than a predetermined distance.

9. The drive power transmission control system as set forth in claim 7, wherein the mode switching means returns the operation mode from the anti-vibration mode to the ordinary mode where a grip state in which the occurrence of the slip state is not judged by the slip state judging means continues longer than a predetermined time period in the anti-vibration mode or where the traveling distance of the vehicle in the grip state continues longer than a predetermined distance.

10. The drive power transmission control system as set forth in claim 7, wherein the slip state judging means judges that the front wheels are slipping if the rotational acceleration of either one of the front wheels exceeds a predetermined threshold value and that the rear wheels are slipping if the rotational acceleration of either one of the rear wheels exceeds a predetermined threshold value.

11. The drive power transmission control system as set forth in claim 9, wherein the slip state judging means judges that the front wheels are slipping if the rotational acceleration of either one of the front wheels exceeds a predetermined threshold value and that the rear wheels are slipping if the rotational acceleration of either one of the rear wheels exceeds a predetermined threshold value.

12. The drive power transmission control system as set forth in claim 6, wherein the clutch device is arranged to be integrated in a differential assembly for the rear wheels.

13. The drive power transmission control system as set forth in claim 6, wherein:

the vehicle is provided with a center differential arranged at a mid position thereof in the front-rear direction, the center differential being connected to the prime mover at an input portion thereof and to the front wheel torque transmission axle and the rear wheel torque transmission axle respectively at a pair of output portions thereof; and the clutch device is arranged in parallel relation with the center differential for drivingly connecting the front wheel torque transmission axle with the rear wheel torque transmission axle therethrough.

* * * * *